United States Patent [19]

Krieg et al.

[11] 3,883,617
[45] May 13, 1975

[54] RESIN MASSES COMPRISING A METHYL METHACRYLATE POLYMER MATRIX AND A STYRENE POLYMER DISPERSE PHASE

[75] Inventors: Manfred Krieg, Darmstadt; Adolf Wohnhas, Darmstadt-Arheilgen, both of Germany

[73] Assignee: Rohm GmbH, Darmstadt, Germany

[22] Filed: May 22, 1973

[21] Appl. No.: 362,719

[30] Foreign Application Priority Data
May 26, 1972 Germany.......................... 2225578

[52] U.S. Cl. ................ 260/883; 260/836; 260/881; 260/885; 260/898; 260/901
[51] Int. Cl. ............................................ C08f 29/50
[58] Field of Search.................... 260/901, 885, 883

[56] References Cited
UNITED STATES PATENTS
3,345,434   10/1967   Griffith .............................. 260/901
3,655,829   4/1972   Ronzoni et al...................... 260/899

Primary Examiner—Murray Tillman
Assistant Examiner—C. J. Seccuro
Attorney, Agent, or Firm—Curtis, Morris & Safford

[57] ABSTRACT

Thermoplastically formable synthetic resin masses which can be shaped into light-diffusing bodies. The masses comprise a matrix of a methyl methacrylate homopolymer or copolymer in which a thermally cross-linked styrene copolymer is dispersed in finely-divided form.

Method of making such masses by dissolving a thermally cross-linkable styrene copolymer in methyl methacrylate or a monomer mixture containing methyl methacrylate; polymerizing the resulting mixture, whereby said cross-linkable copolymer precipitates in finely-divided form; and then heating the resulting resin mass to cross-link said thermally cross-linkable copolymer.

9 Claims, No Drawings

RESIN MASSES COMPRISING A METHYL METHACRYLATE POLYMER MATRIX AND A STYRENE POLYMER DISPERSE PHASE

The present invention relates to thermoplastically formable synthetic resin masses adaptable to the preparation of light-diffusing shaped bodies and to methods of making such masses.

It is known in the art that clouded (i.e., translucent) acrylic resins can be prepared by dissolving polystyrene in methyl methacrylate and polymerizing the latter in a flat chamber to form a sheet. With increasing polymerization, the polystyrene becomes insoluble and precipitates in the form of very small gel droplets. These polystyrene droplets have a diameter of the order of magnitude of one micron and are, therefore, not visible to the naked eye. Nevertheless, because their index of refraction is different from that of polymethylmethacrylate, they effect a dispersion of light. An acrylic resin of this kind is used, for example, for skylights, since good room illumination results because of the light-diffusing effect without significant reduction in the total light transmission. Translucent acrylic resins prepared in other ways, for example by including a small content of filler, are not equally adaptable to this kind of use.

It has until now not been possible to prepare a thermoplastically-formable mass of translucent synthetic resin comprising polymethylmethacrylate in the same manner. To be sure, a translucent thermoplastic formable mass is obtained by the polymerization, in the presence of chain transfer agents, of methyl methacrylate containing dissolved polystyrene. However, on thermoplastic deformation, the translucency is to a great extent lost.

It has also already been attempted to prepare thermoplastically workable translucent formable masses by preparing a cross-linked styrene polymer in the form of an emulsion polymer, isolating it, and mixing it with a formable polymethylmethacrylate mass in a thermoplastic condition. The result of this process is unsatisfactory. Although a translucent material is obtained even after thermoplastic forming, the amount of incident light directly transmitted by the material is relatively high while the total light transmission is lower than for a translucent material containing precipitated polystyrene. In other words, the amount of diffused light is too small.

According to Japanese Pat. publication No. 11 834/71, this advantage can be largely avoided by combining the cross-linked styrene emulsion polymer, not with a formable polymethylmethacrylate mass, but with monomeric methyl methacrylate, and then polymerizing the latter. In order to prevent the settling of the styrene polymer during polymerization and in order to divide the emulsion polymer, which is added in the form of a powder, as far as possible into the size of the primary particles, the batch must be vigorously stirred until its viscosity, at a degree of conversion of 20 – 30 percent by weight, is so high that the danger of the particles settling is overcome. Only thereafter can the material be completely polymerized in bulk or in aqueous suspension.

Because of the numerous polymerization stages required, the process and the formable masses prepared according to the process are correspondingly expensive. If the styrene emulsion polymer is raised to too high a temperature on drying — which can easily result from the desire for a short drying time — it is difficult or even impossible to subdivide the powder particles to the size of the primary particles in monomeric methyl methacrylate by stirring. Further, the polystyrene particles may adhere to one another and form aggregates visible to the naked eye. In both cases, the light-dispersing effect is reduced so that it is difficult to prepare formable masses of uniform quality. In unfavorable cases, the polystyrene particles can combine to form aggregates of such size that on injection molding, and particularly on extrusion, shaped bodies having rough surfaces are obtained.

An object of the present invention is to avoid these faults and to prepare a formable mass which on injection molding, extrusion, or press molding to form a shaped body will retain its light-diffusing properties unchanged.

The formable masses for the preparation of light-diffusing shaped bodies according to the present invention comprise 98 to 99.99 parts by weight of polymethylmethacrylate, or of a copolymer comprising at least 70 percent by weight of methyl methacrylate, and 0.01 to 2 parts by weight of a cross-linked styrene copolymer present therein in a finely-divided state. The cross-linked styrene copolymer is cross-linked by the reaction, with each other, of the same or different mutually reactive groups, present as side groups in the polymer. Such mutually reactive groups include hydroxymethyl amide-, alkoxymethyl amide- (in which the alkoxy group has 1 to 6 carbon atoms), epoxy-, carboxylic acid anhydride-, hydroxy-, carboxy-, and $-NH_2$ groups. The new formable masses are prepared by dissolving a non-cross-linked but heat-cross-linkable styrene copolymer, containing units of the type described, in methyl methacrylate or a monomer mixture predominantly comprising methyl methacrylate, adding a polymerization initiator and other optional known polymerization additives which may be desirable, and polymerizing. During the polymerization, the styrene copolymer precipitates in a finely-divided form which is, however, still non-cross-linked. On further heating, for example to a temperature above 80°C., and preferably to a temperature in the range from 100°C. to 250°C., cross-linking occurs. In this manner, the state of subdivision of the polystyrene particles is fixed in such a fashion that it is no longer altered by thermoplastic forming. The particles have an average particle size (diameter) of 0.5 – 30 microns, preferably from 1 – 10 microns. In practice, a particle size of about 5 microns is considered optimum.

It is assumed that the separation of the styrene copolymer by precipitation during the polymerization of the methyl methacrylate is of considerable significance for the development of a uniform finely-divided condition, and that polymerization of the methyl methacrylate in the presence of the styrene copolymer is an important prerequisite for a strong light-diffusing effect in the polymer. It is possible that a portion of the methyl methacrylate is grafted onto the styrene copolymer, whereby a good union of the two polymer phases is effected at their boundaries.

According to the present invention, a suitable non-cross-linked styrene copolymer is one which is practically homogeneously soluble in methyl methacrylate, even if the polymer is more or less branched by addition reactions or condensation reactions.

The non-cross-linked styrene copolymers as a rule comprise 70 to 99 percent by weight of styrene, the balance of 1 to 30 percent being one or more monovinyl or monovinylidene monomers comprising the above-described cross-linking groups. The most important examples of such monomers are hydroxymethyl acrylamide and hydroxymethyl methacrylamide, as well as the alkyl ethers thereof having 1 – 6 carbon atoms in the alkyl group, particularly the methyl-, ethyl-, and n-butyl ethers. Further, glycidyl acrylate and glycidyl methacrylate, maleic acid anhydride, itaconic acid anhydride, the hydroxyethyl-, hydroxypropyl-, and hydroxybutyl-esters of acrylic acid or methacrylic acid, these last-mentioned acids themselves, and the amides of these acids may be given as examples of such monomers.

Of the aforementioned side groups capable of cross-linking, only the hydroxymethyl amide-, alkoxymethyl amide-, and the epoxy-groups are capable of entering cross-linking reactions with identical groups. Styrene copolymers comprising these groups must be prepared under conditions under which the groups do not react with one another, i.e., at temperatures below 80°C. - 100°C. Styrene copolymers which contain only carboxylic acid anhydride-, hydroxy-, carboxy-, or —NH₂ side groups do not react to form cross-links even at elevated temperatures. However, one can employ a mixture of two or more of such copolymers having different mutually reactive side groups. After precipitation and on heating, the different side groups present in the mixed copolymers can react with one another to effect cross-linking.

The non-self-cross-linking copolymers can also be made self-cross-linkable by reacting them with bifunctional or polyfunctional low molecular weight co-reactive compounds, e.g., a bisphenol or diglycidyl ether of a bisphenol. Examples of such reactions are given below:

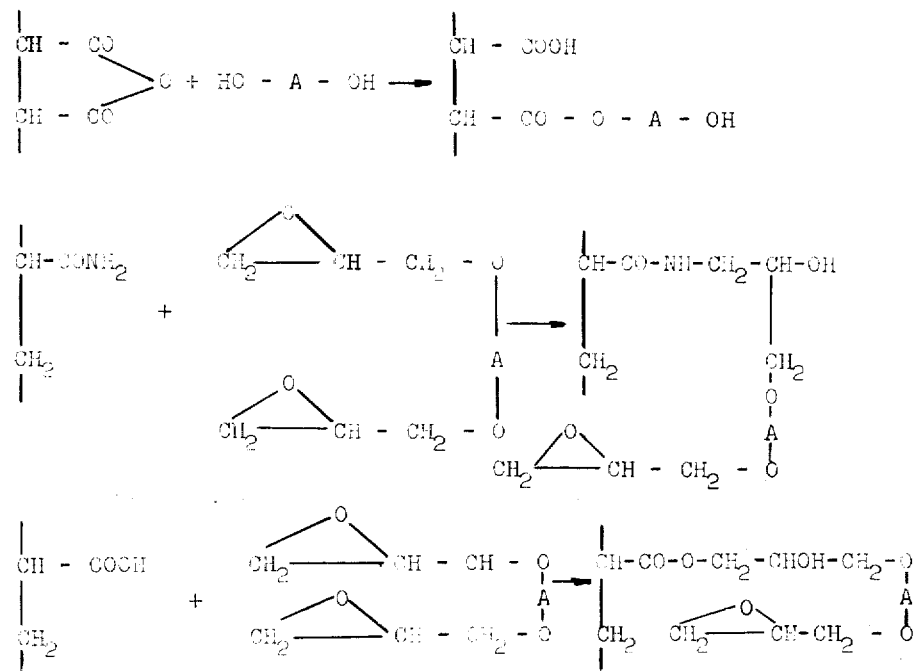

wherein A is a bifunctional group, for example

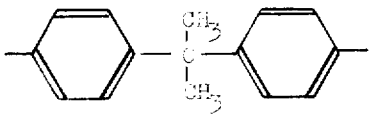

By reactions of this type, styrene copolymers having different mutually reactive groups may be formed from styrene copolymers having only one kind of functional group.

To prepare such copolymers, the bifunctional or polyfunctional compound is dissolved, together with the styrene copolymer, in methyl methacrylate or a monomer mixture containing the same. The compound is preferably so chosen that, on polymerization of the methyl methacrylate monomer or monomer mixture, the compound precipitates together with the styrene copolymer: this desired result is promoted by the presence of aromatic groups in the molecule. The reaction of the bifunctional or polyfunctional compound with the anhydride, hydroxy, carboxy, or —NH₂ side groups of the styrene copolymer then takes place under the same conditions under which further reaction leading to complete cross-linking also takes place.

In order not to influence precipitation of the styrene copolymer negatively, the methyl methacrylate or methyl methacrylate-containing monomer mixture is polymerized under such conditions that a monomer conversion of at least about 10 to about 20 percent takes place without cross-linking of the styrene copolymer. This is accomplished by using a sufficiently low polymerization temperature and/or by the use of a polymerization initiator which is effective at a sufficiently low temperature.

The non-cross-linked styrene copolymer can also be prepared ab initio to contain different monomers having mutually reactive side groups, for example alkoxymethyl acrylamide together with acrylamide. Optionally, acrylic acid or units of the corresponding methacryl compounds may also be present. In this case, cross-linking occurs at lower temperatures than when alkyloxymethyl acrylamide or alkyloxymethyl methacrylamide are present alone. Other examples of such copolymers include those containing units of acrylic acid or methacrylic acid together with their glycidyl esters. Styrene copolymers of this kind are prepared under conditions under which no cross-linking occurs.

In addition to monomer units having reactive side groups, the styrene copolymer may contain limited amounts, for example up to 15 percent by weight, of units of other monomers such as vinyl toluene, N-vinyl carbazole, benzyl acrylate, methyl acrylate, or of still other monomers, preferably those which increase the index of refraction of the resulting copolymer.

Styrene copolymers of the kind described in the preceding disclosure can be prepared by the copolymerization of a predominant amount of styrene, one or more further optional monomers, and with one or more of the aforementioned monomers having a reactive side group. The styrene copolymer can be prepared by any desired polymerization process (generally in the presence of a free-radical-forming initiator and optional chain transfer agents), for example by bulk, suspension, emulsion, or precipitation polymerization, providing premature cross-linking can be avoided. A solution polymerization process is also suitable, but less advantageous because of the need for removing the solvent. The molecular weight of the styrene copolymer plays no important role and, for example, can be in the range of from 10,000 to several million. Molecular weights of from 50,000 to 500,000 are preferred.

Cross-linkable styrene polymers of this type are dissolved in methyl methacrylate or in monomer mixtures principally comprising methyl methacrylate. Comonomers which can be used in combination with methyl methacrylate are monovinyl and monovinylidene compounds including the lower alkyl esters of acrylic acid, such as methyl acrylate, ethyl acrylate, and isopropyl acrylate, as well as acrylonitrile, methacrylonitrile, styrene, vinyl succinimide, and the like.

In choosing these comonomers, care should be taken that they do not too strongly lower the Vicat softening temperature of the forming mass, which should have a Vicat softening temperature of at least 90°C. Esters of methacrylic acid with four or more carbon atoms in the alcohol portion thereof, acrylic esters, and, in general, monomers forming homopolymers which have Vicat softening temperatures far below 90°C., reduce the Vicat softening temperature of the forming mass and are preferably employed only in such amounts that the resulting copolymer with methyl methacrylate has the minimum Vicat softening temperature given above.

The index of refraction of component (A) should, also, be clearly different from that of the styrene copolymer dispersed therein, thus to insure the light-dispersing effect of the latter material. Pure polymethylmethacrylate has an index of refraction of 1.49; pure polystyrene has an index of refraction of 1.59. A sufficient differentation in the indices of refraction is assured if the index of refraction of component (A) is between 1.47 and 1.52, even if the styrene copolymer has a somewhat lower index of refraction than that of pure polystyrene. Monomers which increase the index of refraction, such as styrene or benzyl acrylate, are therefore generally employed in the synthesis of component (A) only in such amounts that the value of 1.52 is not exceeded. The index of refraction cannot be lowered to less than 1.47, even when the greatest permissible amount of comonomer (30 percent by weight) is present in component (A), if those monovinyl or monovinylidene monomers common in industrial use are employed.

When polymerizing, chain transfer agents, particularly long-chain mercaptans, are usually present in the monomer or monomer mixture. With the aid of these chain transfer agents, the intrinsic viscosity of the methyl methacrylate polymers or copolymers can be adjusted to preferred values, $\eta_{sp}/c$, between 30 and 300 ml/g.

The polymerization is initiated in known fashion using free-radical-forming initiators such as azo-diisobutyric acid dinitrile. During the polymerization, the dissolved styrene copolymer precipitates in the form of very fine droplets which are, at this stage, in a non-cross-linked condition. Cross-linking of the styrene copolymer during the methyl methacrylate polymerization only takes place if the polymerization temperature, for example in the end phases thereof, reaches values at which the cross-linking reaction takes place at a noticeable rate. This is, in most cases, not true where temperatures below 80°C., or even below 100°C., are employed. In the final polymerization phase, in which heating over 100°C. occurs, cross-linking will generally begin. As a rule, the styrene polymer is cross-linked by heating the formable mass for a time between 15 minutes to several hours at temperatures in the range from 120°C. to 180°C.

The mass is shaped in conventional fashion by injection molding or extrusion machines at temperatures from about 180° – 250°C. Cross-linking of the styrene copolymer can also take place during plastification of the formable mass in the shaping apparatus. Conventional additives for forming masses can be incorporated thereinto during their preparation or during shaping. Such materials include soluble dyestuffs, lubricants, ultraviolet-absorbing agents, stabilizers, etc.

A better understanding of the present invention and of its many advantages will be had by referring to the following specific example given by way of illustration. (In the example, parts given are by weight unless otherwise indicated).

A. Preparation of a Cross-Linkable Polystyrene Copolymer

A mixture of 93 parts of styrene;
3 parts of methacrylamide;
4 parts of N-methoxymethyl-methacrylamide; and
1 part of azo-diisobutyronitrile is placed into a tube formed from a resin film and is polymerized in a water bath for 24 hours at 50°C. The intrinsic viscosity of the polymer obtained is $\eta_{sp}/c = 90$ ml/g in chloroform at 20°C.

Preparation of further Cross-Linkable Styrene Copolymers

B. A monomer mixture of 95.8 parts of styrene, 4.2 parts methacrylic acid, and 0.75 part of tert.-butyl perpivalate is placed into a film bag and is polymerized in a water bath for 24 hours at 55°C. The intrinsic viscosity of the copolymer obtained is $\eta_{sp}/c = 141$ ml/g in chloroform at 20°C.

C – F. Copolymers C – F are prepared in the same manner. The monomer compositions and the intrinsic viscosities of the resulting copolymers (measured in chloroform at 20°C) are given below:

C. 96 parts of styrene
3.5 parts of acrylamide
$\eta_{sp}/c = 134$ ml/g

D. 93.3 parts of styrene
6.7 parts of glycidyl methacrylate
$\eta_{sp}/c = 187$ ml/g E. 93.8 parts of styrene
6.2 parts of 2-hydroxyethyl methacrylate
$\eta_{sp}/c = 153$ ml/g F. 97.5 parts of styrene
2.5 parts of maleic acid anhydride
$\eta_{sp}/c = 143$ ml/g G. A mixture of 85 parts of styrene, 10 parts of vinyl toluene, 5 parts of N-hydroxymethyl-methacrylamide, 0.5 parts diphenyl disulfide, and 0.5 parts of tert.-butyl perpivalate is placed into a film bag and is polymerized in a water bath for 48 hours at 50°C. The resulting polymer has an intrinsic viscosity of $\eta_{sp}/c = 67$ ml/g in chloroform at 20°C.

EXAMPLE 1

0.5 parts of the cross-linkable styrene Copolymer A is dissolved in a mixture comprising:
94 parts of methyl methacrylate; and
6 parts of methyl acrylate
After the addition of 0.4 part of n-dodecyl mercaptan and 0.06 part of azo-diisobutyronitrile, the mixture is placed into a film bag and polymerized in a water bath for 24 hours at a temperature of 50°C. Subsequently, the material is maintained for 10 hours at 150°C. to effect cross-linking of the styrene copolymer.

The formable mass so obtained has an intrinsic viscosity of $\eta_{sp}/c = 60$ ml/g in chloroform at 20°C. The polymer is white, translucent, and strongly light-dispersing and maintains these properties when it is formed by injection molding or extrusion. The Vicat softening temperature (measured in air) is 112°C.

EXAMPLE 2

The procedure of Example 1 is repeated with the following changes:
0.25 parts of Copolymer B and 0.25 parts of Copolymer C are used instead of Copolymer A,
the monomer mixture comprises of 96 parts of methyl methacrylate and 4 parts of ethyl acrylate. The synthetic resin thus prepared has substantially the same optical properties as the material of Example 1.

EXAMPLE 3

0.25 part of Copolymer B and 0.25 part of Copolymer D are dissolved in a monomer mixture comprising
96 parts of methyl methacrylate
4 parts of butyl acrylate
0.4 part of n-dodecyl mercaptane
0.06 part of azo-diisobutyronitrile.
The polymerization is carried out as described in Example 1. The optical properties of the resulting resin are substantially the same as those of the product of Examples 1 and 2.

EXAMPLE 4

According to the preceding Examples a synthetic resin mass is prepared from a mixture comprising
0.25 part of Copolymer B
0.25 part of Copolymer E
98 parts of methyl methacrylate
2 parts of 2-ethyl-hexyl acrylate
0.4 part of n-dodecyl mercaptane
0.06 part of azo-diisobutyronitrile
The optical properties of the resulting resin are similar to those of the product of Example 1.

EXAMPLE 5

A mixture comprising
0.25 part of Copolymer E
0.25 part of Copolymer F
94 parts of methyl methacrylate
6 parts of methyl acrylate
0.4 part of n-dodecyl mercaptane
0.06 part of azo-diisobutyronitrile
is polymerized as in Example 1 and is subsequently heated to 170°C for 15 hours to effect cross-linking of the styrene copolymer. The optical properties of the resulting resin are similar to those of the product of Example 1.

EXAMPLE 6

The procedure of Example 5 is repeated, using 0.5 part of Copolymer G instead of Copolymers E and F. The resulting resin mass, after heating to 150°C for 10 hours to cross-link the styrene copolymer, has substantially the same optical properties as the product of Example 5.

EXAMPLE 7

The procedure of Example 5 is repeated, using 0.5 part of Copolymer B and 0.3 part of diglycidyl ether of bisphenol A instead of Copolymers E and F, and heating for 20 hours instead of 15 hours to 170°C. The optical properties of the resulting resin mass are similar to those of the product of Example 5.

EXAMPLE 8

A mixture comprising
0.35 part of Copolymer F
0.15 part of Copolymer D
96 parts of methyl methacrylate
4 parts of n-butyl acrylate
0.4 part of n-dodecyl mercaptane
0.06 part of azo-bisisobutyronitrile
is polymerized as described in Example 1. The optical properties of the resulting polymer are similar to those of the product of Example 5.

EXAMPLES 9 and 10

The procedure of Example 8 is repeated using 100 parts of methyl methacrylate or 92 parts of methyl methacrylate and 8 parts of n-butyl methacrylate, respectively, instead of the mixture comprising methyl methacrylate and butyl acrylate. The optical properties of the resin masses thus obtained do not differ significantly from those of the products of the preceding Examples. The two resins have Vicat softening temperatures of 121°C and 115°C, respectively, whereas the products of Examples 1 to 8 have Vicat softening temperatures of about 110° to 113°C.

What is claimed is:

1. A thermoplastically formable synthetic resin mass adaptable to the preparation of light-diffusing shaped bodies, said mass comprising 98 to 99.99 parts by weight of
   A. a polymer having an index of refraction between 1.47 and 1.52 which is
   A 1. a homopolymer of methyl methacrylate or
   A 2. a copolymer formed from a monomer mixture comprising at least 70 percent by weight of methyl methacrylate and at most 30 percent by weight of at least one other monovinyl or monovinylidene monomer copolymerizable with methyl methacrylate; and 0.01 to 2 parts by weight of a cross-linked styrene copolymer having an index of refraction greater than 1.52 and less than 1.59 dispersed in component (A) in the form of particles having an average diameter between 0.5 and 30 microns, said copolymer being the product obtained by the thermal cross-linking of at least one thermally cross-linkable copolymer (B) comprising
   B 1. 70 to 99 percent by weight of styrene and
   B 2. 1 to 30 percent by weight of at least one monovinyl or monovinylidene monomer having mutually reactive hydroxymethylamide side groups or alkoxymethylamide side groups having 1 – 6 carbon atoms in the alkyl portion thereof, said resin mass being prepared by dissolving said thermally cross-linkable copolymer (B), in the presence of a free-radical forming polymerization initiator, in methyl methacrylate or said monomer mixture, heating to a temperature below about 100°C. to initiate polymerization; and, after completion of the polymerization, during which said cross-linkable copolymer precipitates in particulate form, heating the resultant resin mass to a temperature above 100°C. to effect cross-linking of said cross-linkable copolymer to form said cross-linked copolymer.

2. A thermoplastically formable synthetic resin mass as in claim 1 wherein copolymer (A) (2) comprises an alkyl acrylate having from 1 – 8 carbon atoms in the alkyl portion thereof, or an alkyl methacrylate having from 2 – 8 carbon atoms in the alkyl portion thereof, as said monovinyl or monovinylidene compound.

3. A thermoplastically formable synthetic resin mass as in claim 1 wherein polymer (A) has a Vicat softening temperature of at least 90°C.

4. A thermoplastically formable synthetic resin mass as in claim 1 wherein said styrene copolymer (B) comprises 70 – 99 percent by weight of styrene and from 1 – 30 percent by weight of an alkoxymethylamide of acrylic acid or of methacrylic acid.

5. A thermoplastically formable synthetic resin mass as in claim 1 wherein said styrene copolymer (B) comprises 70 – 99 percent by weight of styrene and from 1 – 30 percent by weight of the hydroxymethylamide of acrylic acid or of methacrylic acid.

6. A thermoplastically formable synthetic resin mass as in claim 1 wherein said styrene copolymer particles have an average diameter between 1 and 10 microns.

7. A thermoplastically formable synthetic resin mass as in claim 1 wherein said styrene copolymer (B) comprises from 1 to 15 parts by weight of at least one monovinyl or monovinylidene monomer (B) (3) different from said monomers (B) (1) and (B) (2) and copolymerizable therewith.

8. The method of making a thermoplastically formable synthetic resin mass adaptable to the preparation of light-diffusing shaped bodies which comprises dissolving 0.01 to 2 parts by weight of a thermally cross-linkable copolymer comprising (1) 70 to 99 percent by weight of styrene and (2) 1 to 30 percent by weight of a monovinyl or monovinylidene monomer having mutually reactive hydroxymethylamide side groups or alkoxymethylamide side groups having from 1 – 6 carbon atoms in the alkyl portion thereof, in the presence of a free-radical forming polymerization initiator, in 98 to 99.99 parts by weight of methyl methacrylate monomer or in 98 to 99.99 parts by weight of a monomer mixture comprising at least 70 percent by weight of methyl methacrylate and at most 30 percent by weight of at least one other monovinyl or monovinylidene monomer copolymerizable with methyl methacrylate; heating to a temperature below about 100°C. to initiate polymerization; and, after completion of the polymerization, during which said cross-linkable copolymer precipitates in particulate form, heating the resulting resin mass to a temperature above 100°C. to effect cross-linking of said cross-linkable copolymer to form a cross-linked copolymer.

9. A method as in claim 8 wherein, after polymerization, the resulting resin mass is heated to a temperature between 100°C. and 250°C.

* * * * *